(No Model.)

J. W. STROTHER.
LID FOR POTS, &c.

No. 606,599. Patented June 28, 1898.

Witnesses

Inventor
John W. Strother.
By his Attorneys,

UNITED STATES PATENT OFFICE.

JOHN W. STROTHER, OF WEST MILFORD, WEST VIRGINIA, ASSIGNOR OF TWO-THIRDS TO FLOYD E. MORRISON, OF CLARKSBURG, WEST VIRGINIA.

LID FOR POTS, &c.

SPECIFICATION forming part of Letters Patent No. 606,599, dated June 28, 1898.

Application filed December 30, 1897. Serial No. 664,520. (No model.)

*To all whom it may concern:*

Be it known that I, JOHN W. STROTHER, a citizen of the United States, residing at West Milford, in the county of Harrison and State of West Virginia, have invented a new and useful Lid for Pots, &c., of which the following is a specification.

The invention relates to improvements in lids for pots and analogous receptacles.

The object of the present invention is to improve the construction of lids for pots and other vessels and to provide a simple, inexpensive, and efficient one adapted to clamp firmly the upper edges of a pot and capable of enabling the liquid contents, after boiling, to be poured off readily without liability of scalding the hands or losing any of the solid contents.

The invention consists in the construction and novel combination and arrangement of parts, as hereinafter fully described, illustrated in the accompanying drawings, and pointed out in the claims hereto appended.

Figure 1:
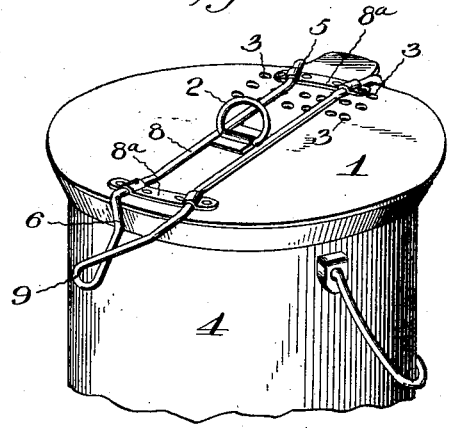
Figure 2:
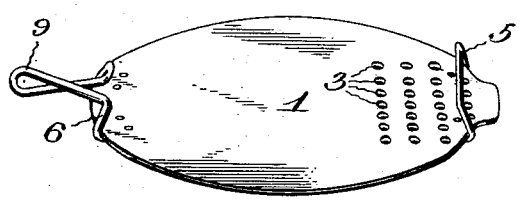
Figure 3:
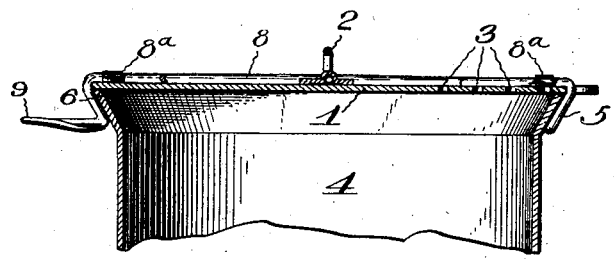

In the drawings, Figure 1 is a perspective view of a lid constructed in accordance with this invention and shown applied to a pot. Fig. 2 is a detail perspective view of the lid, showing the bottom thereof. Fig. 3 is a vertical sectional view of the lid and the pot.

Like numerals of reference designate corresponding parts in the several figures of the drawings.

1 designates a lid constructed of sheet metal, provided on its upper face with a centrally-arranged handle 2 and having at one side perforations 3 for the escape of steam and also to permit the liquid contents of a pot 4 or other receptacle to be drained off without loss of any of the solid contents and without liability of scalding the hands of the operator.

In order to retain the lid on the pot, it is provided at one side with a depending resilient loop 5, and it has at the opposite side a resilient catch 6, and the loop and catch are adapted to engage the exterior of a pot at the upper edge thereof sufficiently firmly to hold the lid securely in place.

The loop and the catch are preferably constructed of a single piece of spring wire, and the connecting portions 8 extend diametrically across the upper face of the lid and are secured to the same by metal straps or plates 8ª. The connecting portions 8 diverge as they approach the periphery of the lid, and the plates or straps 8ª, which are arranged at the opposite edges of the lid, are curved, as shown, and riveted to the said lid at opposite sides of each connecting portion 8. The loop extends inward, forming a resilient tongue or hook, and the catch, which is adapted to engage the pot similarly, is provided with an integral horizontally-extending finger-piece or loop 9, formed by bending the loop of the catch outward at right angles and twisting the horizontal portion, as shown.

In applying the lid to a pot the handle 2 is grasped with one hand and the loop or tongue is hooked under the flange or flared portion at the upper edge of the pot, and the clasp or catch 6 is grasped with the other hand and drawn outward until it is sprung over the bead or flange of the pot. The lid is then securely held in place, and it cannot become accidentally unfastened by the contents of the pot coming in contact with it in pouring off the liquid after boiling.

The invention has the following advantages:

The lid is simple and comparatively inexpensive in construction and adapted to be readily applied to a pot. It permits the escape of steam and the perforations also serve as a strainer, so that the contents of a pot or analogous receptacles may be poured off without losing any of the solid contents.

The lid by being fastened upon the pot serves as a shield to prevent the hands of a person from being scalded in handling the pot.

Changes in the form, proportion, and minor details of construction may be resorted to without departing from the spirit or sacrificing any of the advantages of this invention.

What I claim is—

1. The combination of a lid, a depending loop arranged at one side of the lid and adapted to engage under the flange or shoulder at the top of a pot, and a depending loop-shaped catch located at the opposite side of the lid and provided with an outwardly-extending thumb-piece, said loop and catch being constructed of a single piece of wire having connecting portions extending from one side of the lid to the other, substantially as described.

2. The combination of a lid, a loop depending from one side of the lid and adapted to engage a pot, the catch, located at the opposite side of the lid and consisting of a depending loop bent outward to form a thumb-piece, said catch and loop being constructed of a single piece of wire having connecting portions extending across the center of the lid, and the curved plates secured to the lid at the edges thereof and fastening the said connecting portions to the same, substantially as described.

In testimony that I claim the foregoing as my own I have hereto affixed my signature in the presence of two witnesses.

JOHN W. STROTHER.

Witnesses:
L. L. LANG,
A. B. BOGGESS.